US006210768B1

(12) United States Patent
Blok et al.

(10) Patent No.: US 6,210,768 B1
(45) Date of Patent: Apr. 3, 2001

(54) ADHESIVE NOTE DISPENSING ROLL HAVING INDIVIDUAL RELEASE SHEETS

(75) Inventors: Lana M. Blok, Bayside; Larry E. Wenzler, Oak Creek; Gene A. Wright, Pewaukee, all of WI (US)

(73) Assignee: Tricor Direct, Inc., Branford, CT (US)

( * ) Notice: Subject to any disclaimer, the term of this patent is extended or adjusted under 35 U.S.C. 154(b) by 0 days.

(21) Appl. No.: 09/321,277

(22) Filed: May 27, 1999

(51) Int. Cl.[7] ............................ B32B 7/12; B65D 85/675

(52) U.S. Cl. ........................... 428/41.8; 428/43; 206/389; 206/409

(58) Field of Search .................................... 156/252, 253, 156/269, 270, 289, 263, 265, 324, 538, 543; 428/40.1, 41.7, 41.8, 42.2, 42.3, 43; 206/389, 409, 411, 412

(56) References Cited

U.S. PATENT DOCUMENTS

| | | | | |
|---|---|---|---|---|
| 2,278,673 | | 4/1942 | Savada et al. | 154/43 |
| 3,111,449 | | 11/1963 | Gold et al. | 161/151 |
| 3,312,005 | | 4/1967 | McElroy | 40/2 |
| 3,885,070 | | 5/1975 | Chapman | 428/42 |
| 4,032,679 | | 6/1977 | Aoyagi | 428/42 |
| 4,055,249 | | 10/1977 | Kojima | 206/447 |
| 4,188,250 | | 2/1980 | Grass | 156/253 |
| 4,231,837 | * | 11/1980 | Ramey et al. . | |
| 4,327,875 | * | 5/1982 | Lightfoot . | |
| 4,627,994 | | 12/1986 | Welsch | 428/41 |
| 4,696,843 | | 9/1987 | Schmidt | 428/41 |
| 4,989,801 | * | 2/1991 | Thomas et al. . | |
| 5,002,626 | * | 3/1991 | Tezuka et al. | 156/267 X |
| 5,288,714 | * | 2/1994 | Marschke . | |
| 5,324,078 | | 6/1994 | Bane | 283/81 |
| 5,326,617 | | 7/1994 | Wright et al. | 428/136 |
| 5,336,541 | | 8/1994 | Kobayashi | 428/40 |
| 5,417,345 | * | 5/1995 | Smith . | |
| 5,484,499 | * | 1/1996 | Marschke . | |
| 5,512,343 | | 4/1996 | Shaw | 428/40 |
| 5,575,574 | * | 11/1996 | Mertens . | |
| 5,707,713 | | 1/1998 | Langan et al. | 428/195 |
| 5,827,591 | * | 10/1998 | Blok et al. | 428/41.8 X |
| 5,904,283 | * | 5/1999 | Kanbar . | |
| 5,941,413 | * | 8/1999 | Roman . | |
| 6,001,209 | * | 12/1999 | Popat et al. | 428/41.8 X |

FOREIGN PATENT DOCUMENTS 2 317 365 * 3/1998 (GB) .

* cited by examiner

*Primary Examiner*—Curtis Mayes
(74) *Attorney, Agent, or Firm*—Whyte Hirschboeck Dudek SC

(57) ABSTRACT

A strip for dispensing adhesive notes is described. The strip includes a row of at least first, second and third notes disposed consecutively in lateral alignment removably adhered to a row of at least first, second and third release sheets disposed consecutively in lateral alignment such that each note is disposed in alternate staggered relation to each release sheet. The individual note may be removed with its corresponding laterally offset release sheet in order to avoid a continuous release sheet stream at the point of dispensing. The notes and release sheets may be separated by transverse score lines, perforation lines, or lines of weakness in order to facilitate their removal from the strip. The strip may be placed in a row form and placed in a dispenser as part of a dispensing kit.

12 Claims, 4 Drawing Sheets

FIG. 1
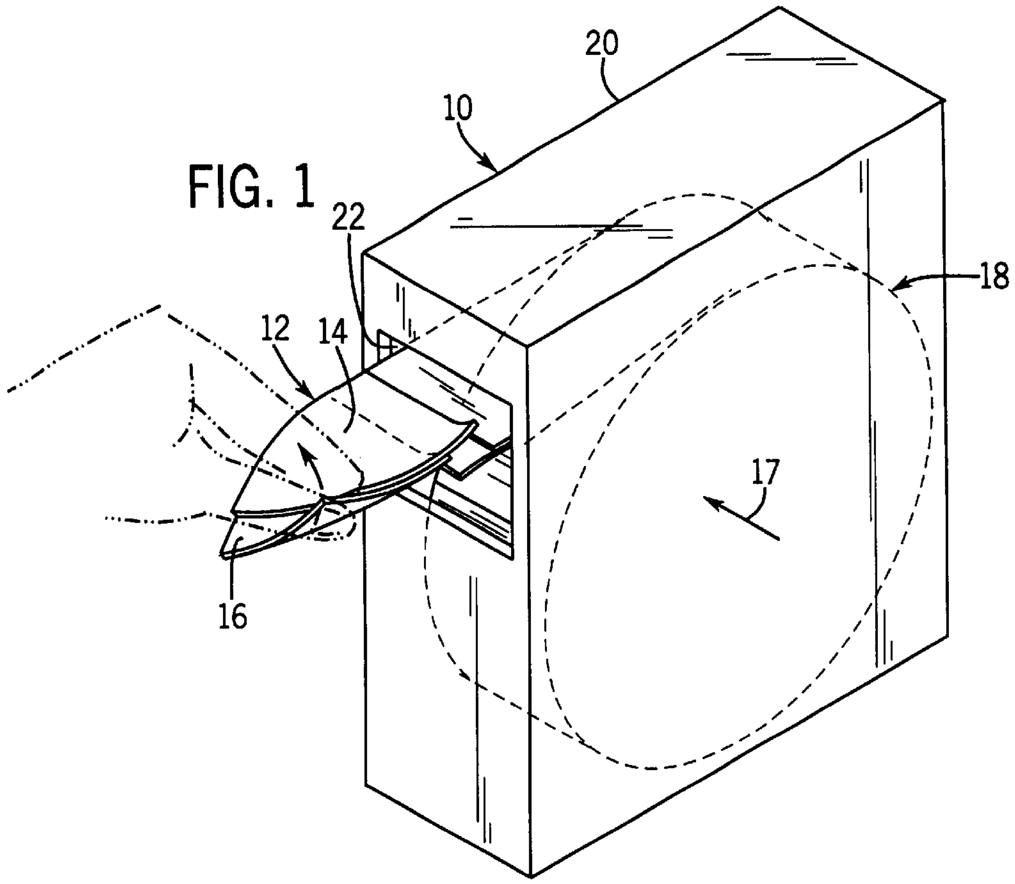
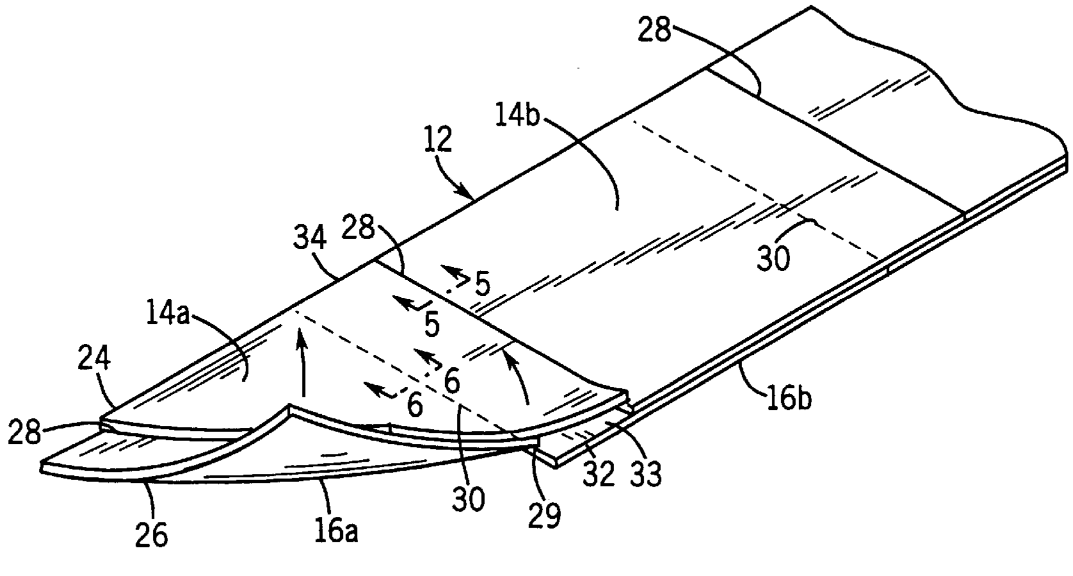
FIG. 2

ADHESIVE NOTE DISPENSING ROLL HAVING INDIVIDUAL RELEASE SHEETS

BACKGROUND OF THE INVENTION

1. Field of the Invention

This invention is in the field of adhesive sheets in roll form and a method for making them.

2. Description of Related Art

Label assemblies which utilize pressure sensitive adhesive coated labels adhered to a continuous release sheet are known. Such label assemblies are available in sheet or roll form with, or without, a blank facing capable of receiving markings. Such label assemblies are often used to mark folders, address envelopes, label containers, label file cabinets, label shelves and so forth. Typically, such labels are made of paper and are removed from the release sheet by bending the release sheet and "picking" at the label.

In many applications, such as, industrial settings, research and development laboratories, warehouses and the like, it is found that previous removable notes and labels utilizing continuous release sheets tend to create long streams and undesirable piles of the release sheets after the notes have been removed. The presence of the release sheet streams and piles tends to create an unsightly and cluttered environment. Additionally, the streams and piles of release sheets may interfere with or inhibit the ability of a user of the removable notes and labels to get to and remove the notes and labels. This situation is exacerbated particularly where the notes and labels are heavily used, where the streams and piles of release sheets tend to grow relatively quickly, before being cleared away. The additional time and attention directed to the piles of release sheets reduces overall productivity and creates an undesirable work environment.

Moreover, in such situations where the label is removed from a continuous release sheet, the entire adhesive surface is immediately exposed. It would be beneficial if the full surface of the note having the pressure sensitive adhesive would not have to be exposed until just before the user desired to place the note.

Therefore, it would be advantageous to have a release sheet and note strip that overcomes the aforementioned problems that provides an adhesive note that is dispensed with a release sheet attached. In this way, the release sheet can be disposed of at the point of placement, which may not necessarily be close to the initial dispensing area. The removal of the release sheets from the dispensing area would reduce the amount of release sheet obstruction at the point of note dispensing. Additionally, it would be desirable to be able to provide as "fresh" an adhesive surface as possible by allowing for the removal of the release sheet, if desired, just prior to placement of the note.

SUMMARY OF THE INVENTION

The present invention provides a repositionable adhesive note dispensing roll having individual release sheets that overcomes the aforementioned problems.

One aspect of this invention is a strip for dispensing adhesive notes, said strip comprising:

(a) a row of at least a first, second and third release sheet disposed consecutively relative to each other in lateral alignment; and (b) a row of at least a first, second and third note disposed consecutively relative to each other in lateral alignment, said row of notes facing said row of release sheets and laterally offset relative to said row of release sheets such that each note and each release sheet is disposed in alternate staggered relationship relative to each other, each note defining a first and a second face, said first face being printable thereon and said second face having an adhesive applied thereon such that said layer of adhesive releasibly adheres to adjacent sheets of said row of release sheets so that at least one note may be peeled from the strip together with a corresponding number of adjacent release sheets.

In another aspect of the invention, a strip for dispensing adhesive notes is disclosed, said strip comprising:

(a) a plurality of release sheets including at least a first. second and third release sheet, each sheet having a first and second side and a first and a second portion on the first side; and (b) a plurality of notes including at least a first, second and third note, each note :defining a printable first face and an adhesive second face. each note having a first and a second part, said first portion of said first release sheet being releasibly adheled to said second part of said first note, said second portion of said first release sheet being releasibly adhered to said first part of said second note, said second part of said second note being releasibly adhered to said first portion of said second release sheet.

In another aspect of the invention, a strip for dispensing adhesive notes is disclosed comprising:

(a) a first web having one surface coated with an adhesive; and (b) a second web having at least one release surface facing and releasibly engaged with the adhesive surface of the first web, the first web defining a series of transverse score lines or lines of weakness and the second web also defining one of a series of transverse score lines and lines of weakness, wherein the transverse score lines or lines of weakness of the second web are in staggered relationship to the transverse score lines or lines of weakness of the first web.

Another aspect of this invention is an adhesive note dispensing kit comprising:

a strip for dispensing adhesive notes in a roll form; and a dispenser adapted for holding the strip such that the strip rotates about a roll form axis to present, for removal by pulling. an adhesive note together with at least one release sheet.

Another aspect of this invention is a method for making the strip of the present invention comprising:

adherinig a continuous note sheet having a pressure sensitive adhesive to a continuous release sheet;

sectioning the continuous note sheet into a plurality of notes; and sectioning the continuous release sheet into a plurality of release sheets laterally offset from the notes.

These and other aspects of the invention are described in greater detail below.

BRIEF DESCRIPTION OF THE DRAWINGS

FIG. 1 is a perspective view of a kit for dispensing adhesive notes illustrating the removal of a note and release sheet from the strip in accordance with the present invention.

FIG. 2 is an enlarged partial perspective view of a strip of the present invention illustrating the removal of the note and release sheet.

DETAILED DESCRIPTION OF THE INVENTION

Figure 3:
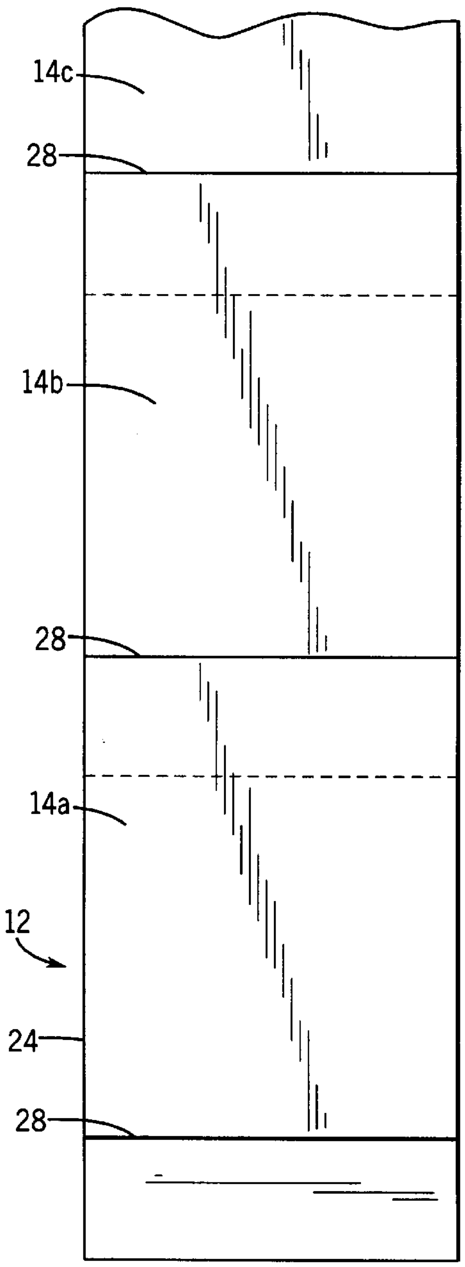
FIG. 3 is a partial top plan view illustrating the front side of an enlarged portion of the unrolled end of the strip of FIG. 1.

The adhesive notes of the present invention may be constructed of any materials known in the adhesive note art such as paper, synthetic materials, cloth, or plastic film and having any suitable adhesive note characteristics. The adhesive notes are preferably made of a flexible polymer film, polymer-reinforced sheet or cloth having a Taber stiffness of not less than 0.03, preferably not less than 0.05, measured according to ASTM D747. The polymer film, polymer-reinforced sheet or cloth preferably has a tensile strength of at least 2000, preferably 4000 and more preferably 5000, N/m, up to any value, such as up to 8000 N/m and it also preferably has a minimum elongation of at least about 4 percent and more preferably at least about 50 percent, the tensile strength and percent minimum elongation being measured according to ASTM D1000.

The film, sheet or cloth may be selected from a wide range of materials. Examples include polymer films made of natural and/or synthetic polar and/or nonpolar materials such as polyolefins, e.g., homopolymers and interpolymers derived from substituted and unsubstituted olefinically unsaturated hydrocarbons including ethylene, propylene, styrene, butadiene, dicyclopentadiene, etc., and materials which contain polar functional groups such as hydroxyls, etherals, carbonyls, carboxylic acids (including salts thereof), carboxylic acid esters (including thio esters), carboxylic anhydrides, amides, amines, etc. Synthetic materials having polar groups are preferred. Illustrative examples include polyesters, polyamides, and carboxylated styrene-butadiene polymers.

The polymer-reinforced sheets comprise at least one of the natural or synthetic polymers described above together with a reinforcing material. The reinforcing material may be organic or inorganic. Illustrative organic materials include natural materials such as cellulosic fibers such as cotton, paper, hemp, etc., and synthetic materials such as fibers made of the aforementioned natural or synthetic polymers. Inorganic materials include any of the many well known fillers used in the plastics industry such as silica, talc, mica, etc.

The front surface of the film, sheet or cloth is capable of receiving markings. This capability is either an inherent property of the film, sheet or cloth or is obtained by a treatment of its surface using conventional means known in the art. Preferably the front surface is capable of receiving markings with a ballpoint pen, a marking pen or a pencil. It is also preferable that the front surface be capable of absorbing ink such as ballpoint or marking pen ink into the surface to reduce potential smearing of the ink after it is applied.

The adhesive may be applied to the above films, sheets and cloths in a conventional manner, such as by spraying, knife coating, roller coating, casting, drum coating, extrusion coating, coextrusion coating, and the like or unsupported pressure sensitive adhesive may be transferred or laminated to the film, sheet or cloth. The adhesive is preferably coated in a manner which covers substantially the entire back side of the film, sheet or cloth. The adhesive is preferably coated at a thickness in the range from 0.5 to 3 mil, more preferably in the range from 1 to 3 mil.

The adhesive combines an initial tack value of at least 200 g according to ASTM D2979 measured on a Polyken™ probe tack tester, an adhesive strength of at least 100 N/m according to ASTM D1000 and an adhesive tack sufficient to prevent conformability failure of the adhesive sheet after 10 hours conformability testing (which is further described below) and yet having a cohesive strength sufficient to allow removal of the adhesive sheet from the substrate without leaving any residue behind on the substrate.

Typically, the adhesives which are useful in the present invention comprise an elastomeric polymer. Examples of useful elastomeric polymers include natural rubber, styrene/diene rubber such as styrene/butadiene block copolymer, styrene/isoprene block copolymer, styrene/ethylene-butylene block copolymer, polyisobutylene rubber, and acrylic elastomer. Specific examples of elastomeric polymers include Heveacrumbr™ (natural rubber) available from Herron & Meyer, Synpol™ (a styrene/butadiene copolymer rubber) available from Ameripol Synpol Corp., Vistanex™ (a polyisobutylene elastomer) available from Exxon Chemical, Duro-Tak™ (an acrylic resin elastomeric adhesive) available from National Starch and Chemical Corp., and Aroset™ (a modified acrylic resin elastomeric adhesive) available from Ashland Chemical, Inc.

The adhesives useful in the present invention also may contain one or more tackifier resins such as rosin, hydrogenated rosin, rosin ester, synthetic hydrocarbon tackifier, and low molecular weight, low glass transition temperature polycarboxylic acid esters. Preferred tackifiers include rosin esters, polyterpenes, and polybutenes. Specific examples of tackifier resins include Foral™ (a rosin ester tackifier) and Piccolyte™ (a polyterpene tackifier), both available from Hercules, Inc., and Indopol™ (a polybutene tackifier) available from Amoco Chemicals Corp.

Antioxidants are employed to the extent necessary to prevent degradation of the adhesive with time. Examples include hydroquinone and hindered phenol antioxidants. Specific examples of antioxidants include Santovar A (2,5-di-tert-amylhydroquinone antioxidant) available from Flexsys America L.P., Agerite Resin D (polymerized 1,2-dihydro-2,2,4-trimethylquinoline monomer) available from R. T. Vanderbilt Co. and Wingstay L (butylated reaction product of p-cresol and dicyclopentadiene) available from Goodyear Tire & Rubber Co.

Adhesive formulations may include a plasticizer, such as a polyketone resin, and/or a surfactant, such as Tween™, a polysorbate 20 surfactant available from ICI Specialties Mfg.

When the adhesive contains a tackifier, the tackifier may be present in a wide range of amounts, depending on the amount required to achieve the required initial tack value, adhesive tack and adhesive strength. In one embodiment, the adhesive has a weight ratio of tackifier to elastomer in the range from 0.5 to 2.0:1, preferably in the range from 0.8 to 1.8:1.

In one preferred embodiment of this invention, the adhesive formulation used to make the adhesive sheets comprises at least one elastomer, at least one tackifier, at least one antioxidant, at least one curing agent, at least one accelerator, and at least one solvent. The elastomer is preferably present in an amount of at least 5 wt %, more preferably at least 10 wt %, up to 25 wt %, more preferably up to 20 wt %. The tackifier is preferably present in an amount of at least 5 wt %, more preferably at least 10 wt %, up to 40 wt %, more preferably up to 30 wt %. The curing agent is preferably present in an amount of at least 0.1 wt % up to 10 wt %. The accelerator is preferably present in an amount from 0.1 to 1 wt %.

In another preferred embodiment of this invention, the adhesive formulation used to make the adhesive sheets comprises at least one acrylic-based adhesive in an appropriate solvent.

One approach to preparing an adhesive for use in this invention is to add elastomeric polymer, antioxidant, curing agent and accelerator to a tackifier resin which has been thinned with an appropriate solvent, adding additional appropriate solvent as needed.

Curing of the adhesive may be activated by any conventional method, such as by exposure to air, elevated temperatures and/or radiation. Examples of radiation include ultraviolet light and actinic radiation. Curing via exposure to radiation includes the use of curing initiators which generate sufficient free radicals upon exposure to the selected radiation to initiate curing of the adhesive. Such initiators are well known in the polymer curing art.

In yet another preferred embodiment of this invention, the adhesive is formulated with little or no solvent for application as a hot melt thermoplastic adhesive. Hot melt thermoplastic adhesives typically contain little or no solvent. Any of a wide range of thermoplastic adhesives may be used as long as they comply with the conditions set forth above. They are commercially available from several manufacturers. Examples include HL-2194-X, HM-2703, HL-2198-X and HL-2268-X available from H. B. Fuller Co.; Duro-Tak™ 9820, 6123, 4136 and 1236 available from National Starch and Chemical Corp.; CA-501 (SIS/SBS), CA-502-4A (SIS/SBS), CA-503-A (SIS/SBS), CA-506 (SIS/SBS), C-X805-1 (Acrylic), C-882 (Acrylic), and C-X885 (Acrylic) available from Century International and H2091, H2114-01, and 801-375 available from Findley Adhesives, Inc. Suitable hot melt thermoplastic adhesives are also disclosed, for example, in U.S. Pat. No. 4,728,572, which is incorporated herein by reference.

The release sheets may be constructed of any materials known in the release sheet art and having any suitable release sheet characteristics. The release sheets are preferably made of, for instance, a suitable paper or polymer based substrate, or other materials commonly employed for making release sheets. Of course, other materials may be used to implement the advantages of the invention. Preferably, the release sheets have at least one side coated with a suitable release agent, such as a silicone or silicone rubber, for releasably receiving the adhesive coated side of the note.

The kit of the present invention includes a strip for dispensing adhesive notes in a roll form. The kit also includes a dispenser which is adapted for holding the strip such that the strip rotates about a roll form axis. The dispenser presents, for removal by pulling, an adhesive note together with at least one release sheet.

Referring now to FIG. 1, a kit for dispensing adhesive notes is illustrated by the numeral 10. The kit 10 includes a strip 12, which includes notes 14 releasibly adhered to adjacent release sheets 16. The strip 12 is shown in the form of a roll 18 (shown in phantom), which is disposed within dispenser 20 and rotates about roll form axis 17 which is transverse to the longitudinal plane of the roll 18. Dispenser 20 is shown as a rectangular box, however, it is contemplated by the present invention that any size and shape of dispenser 20 which effectively allows the removal of strip 12 may be suitably employed. Dispenser 20 has a passageway 22 which allows for the withdrawal of additional lengths of strip 12 from the roll 18 within dispenser 20.

FIG. 2 illustrates an enlarged portion of the unrolled end of strip 12. The strip 12 includes a note web 24, which is made up of individual notes 14*a* and 14*b*. The note web 24 is releasably adhered to release sheet web 26, which includes a series of consecutive individual release sheets 16*a* and 16*b*. Each release sheet 16*a* defines a border 29 between release sheets 16*a*–16*b* and adjacent a juncture 28 between adjacent notes 14*a*–14*b*. The juncture 28 and the border 29 may comprise gaps, perforations, or transverse score lines. By lifting along the border 29, an individual note 14*a* combined with release sheet 16*a* may be removed from the strip 12 at the border 29. The border 29 may be laterally offset from the juncture 28 so that when lifting the release sheet 16*a* along the border 29, a portion 33 of the release sheet 16*b* remaining adhered to the strip 12 protrudes beyond the note 14*b* to which release sheet 16*b* is adhered. Transverse score lines in juncture 28 may be cut across note web 24 to create the individual notes 14*a* and 14*b*. It is understood that the present invention contemplates scoring, perforating, creating lines of weakness or any other method of subdividing or sectioning the strip to create resultant individual notes and release sheets. Additionally, pre-cut notes and release sheets could also be adhered together. Similarly, transverse score lines 30 (shown partially in phantom) may preferably be cut across release sheet web 26 to create the individual release sheets 16*a* and 16*b*. The transverse score lines 28 of note web 24 are laterally offset relative to transverse score lines 30 of release sheet web 26. The result is that each individual note 14*a* and 14*b* is laterally offset from each release sheet 16*a* and 16*b*, such that each note is disposed in alternate staggered relationship relative to one another. This arrangement is consistent throughout the entirety of the strip 12.

During use, an individual note 14*a*, for example, is preferably removed from the strip 12 with its corresponding release sheet 16*a* to expose face 32 of the next release sheet 16*b*. The same procedure is utilized for successive note removal. Because the note 14*a* is removed with a corresponding release sheet 16*a*, a substantial portion of the adhesive in the strip 12 is unexposed prior to removal from the release sheet. It will be readily recognizable that note 14*a* along with corresponding release sheet 16*a* may be removed beginning at edge 34 to obtain the same result. One goal is to remove note 14*a* with its corresponding release sheet 16*b* such that a release sheet strip is not created at the point of dispensing. Release sheet 16*a* may be removed from note 14*a* and discarded as appropriate. The successive note 14*b* is then available for use to be removed in a similar manner.

FIG. 3 illustrates the front side of an enlarged portion of the strip 12. The note web 24 is preferably divided among transverse score lines 28 such that each individual note 14*a*, 14*b* and 14*c* are of the same size and shape.

Figure 4:
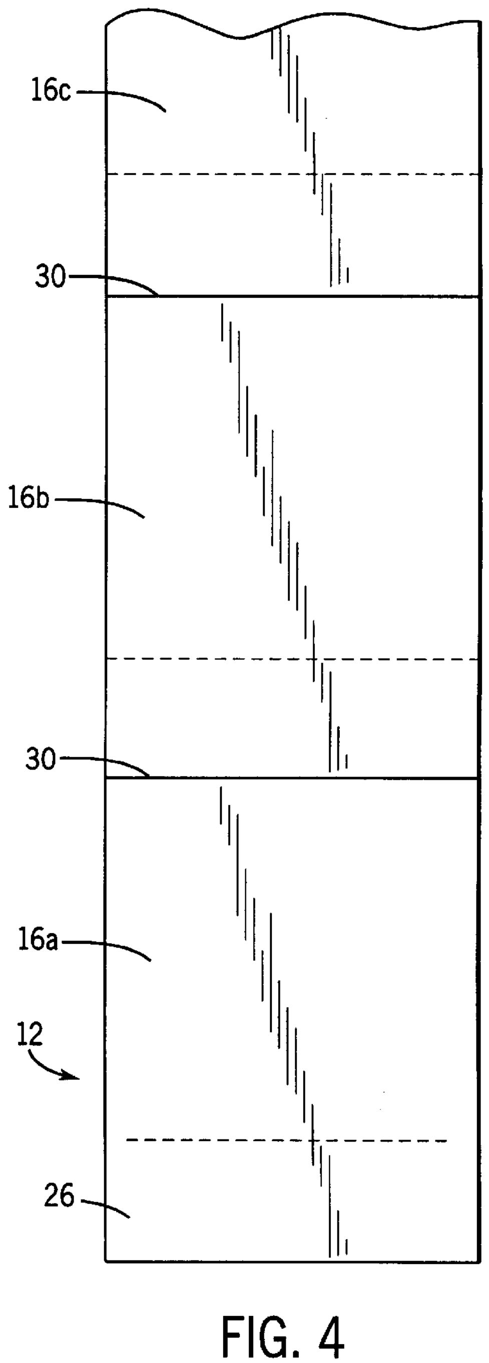
FIG. 4 is a partial bottom plan view illustrating the back side of the enlarged portion of the unrolled end of the strip of FIG. 1.

Similarly, in FIG. 4 which illustrates the backside of an enlarged portion of the strip 12, the release sheet web is divided along transverse score lines 30 such that release sheets 16*a*, 16*b* and 16*c* have the same size and shape as notes 14*a*, 14*b* and 14*c*.

Figure 5:
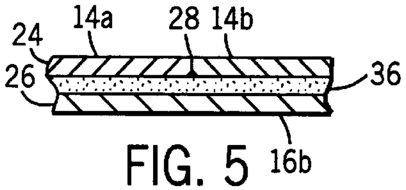
FIG. 5 illustrates an enlarged partial cross sectional view of the strip taken along line 5—5 of FIG. 2.

FIG. 5 illustrates an enlarged partial cross sectional view of the indicated portion of FIG. 1. Note web 24 generally and notes 14*a* and 14*b* specifically, are adhered to release sheet web 26 and release sheet 16*b* with adhesive 36. Note web 24, release sheet web 26 and adhesive 36 are specifically chosen such that adhesive 36 has a stronger adhesive bond to note web 24, and therefore notes 14*a* and 14*b*, than to release sheet web 26 which includes release sheets 16*a* and 16*b*. Release sheet web 26 may be continuous, such as where the note web 24 is divided by transverse score line 28 to separate notes 14*a* and 14*b*.

Figure 6:
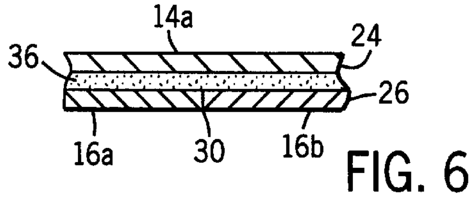
FIG. 6 is an enlarged partial cross sectional view of the strip taken along line 6—6 of FIG. 2.

As illustrated in FIG. 6, adhesive 36 adheres note 14*a* to release sheets 16*a* and 16*b* in a similar manner. Note web 24 may preferably be continuous, such as where release sheet web 26 is divided by transverse score line 30 into release sheets 16*a* and 16*b*.

Figure 7:
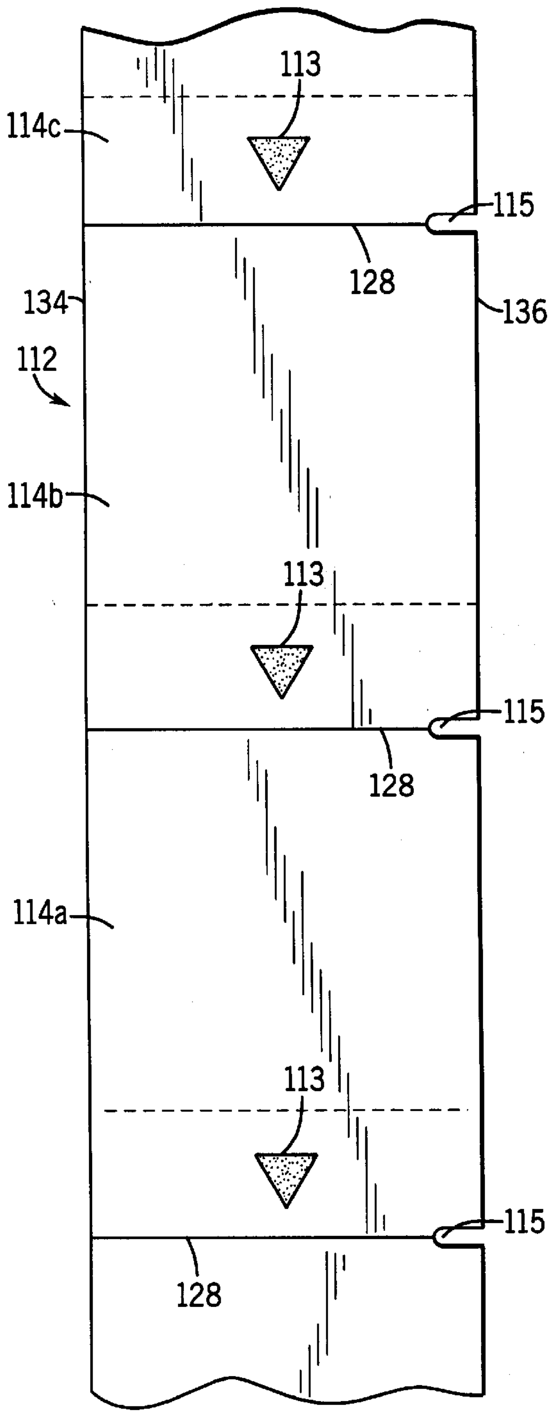
FIG. 7 is a partial top plan view illustrating an alternative embodiment of an enlarged portion of the unrolled end of the strip of FIG. 1.

Referring now to FIG. 7, an alternative embodiment of the present invention is illustrated. Located on each note 114*a*, 114*b* and 114*c* may reside an insignia 113 or other identifying indicia. Insignia 113 may be decorative or may be used to identify to the user of the adhesive strip 112 the location of the transverse score lines 128 between successive notes 114*a*–114*c*. Additionally, transverse score lines 128 may include notches 115 to control the placement of the insignia by a printer (not shown). It is contemplated by the present invention that notches 115 may be used on opposing edge 134 along the transverse score line 128 in combination with or independent of the notches 115 along edge 136.

Figure 8:
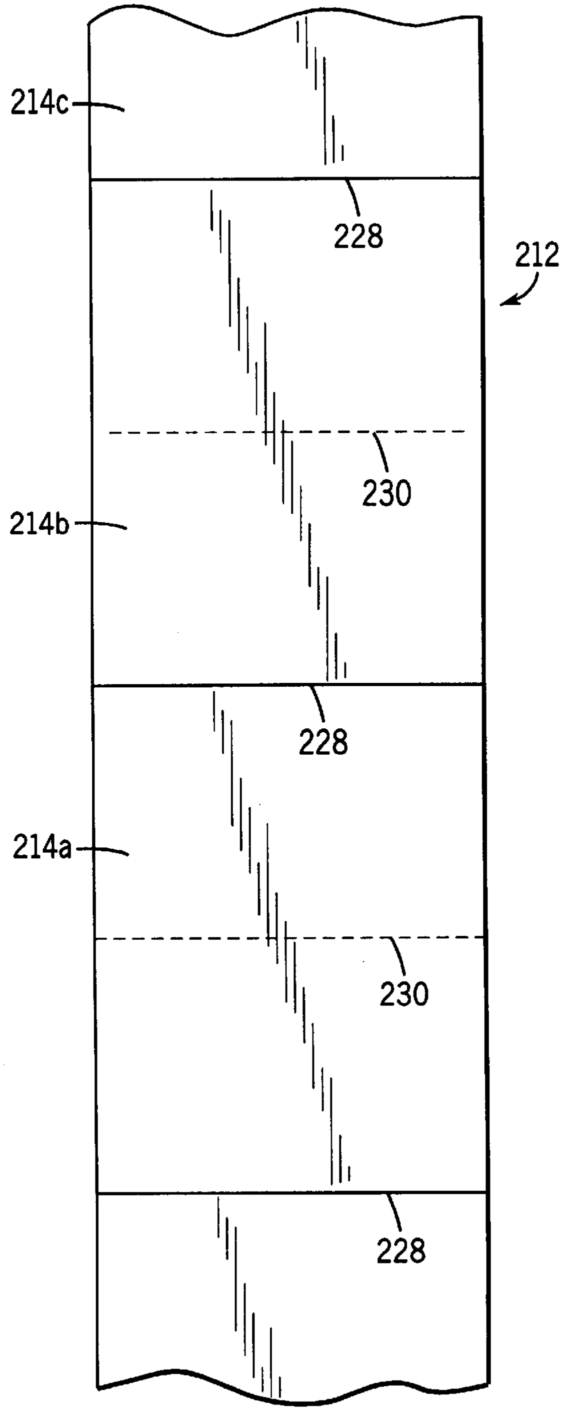
FIG. 8 is a partial top plan view illustrating another alternate embodiment of the present invention.

FIG. 8 illustrates another alternate embodiment of the present invention. In this embodiment, the strip 212 includes notes 214*a*, 214*b* and 214*c* that are separated by transverse score lines 228 such that the score lines 228 are laterally offset from the transverse score lines 230 of the release sheets (hidden). In this embodiment, the lateral offset is equal to approximately half the size of the size of the notes 214*a*–214*c* but it is contemplated by the present invention to incorporate any amount of lateral offset between transverse score lines 228 and transverse score lines 230.

Figure 9A:
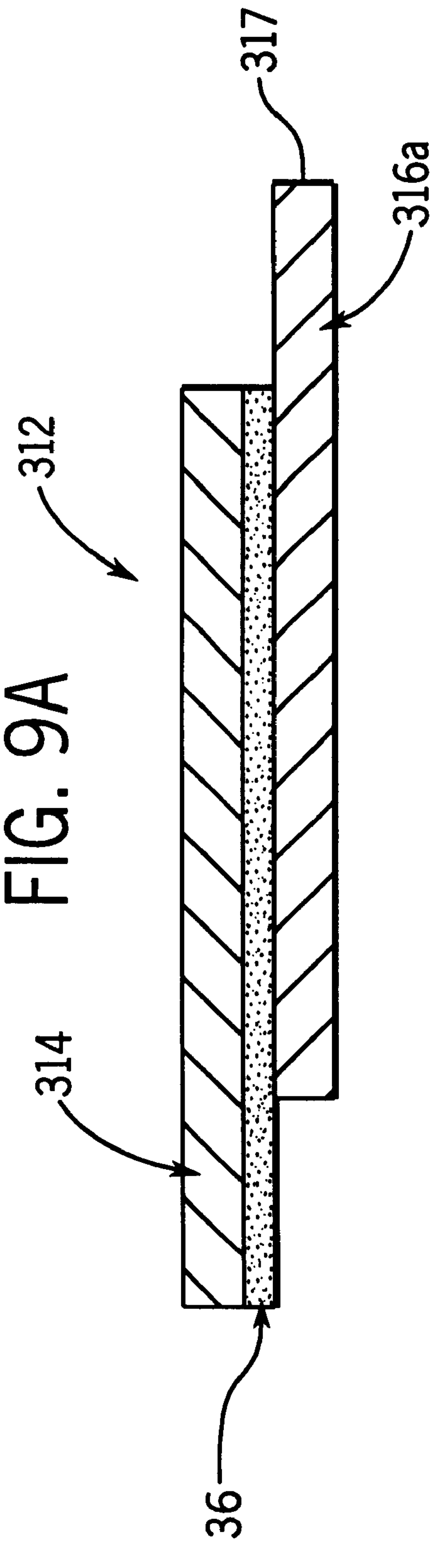
FIG. 9A is a cross-sectional view of another alternate embodiment of the present invention.
Figure 9B:
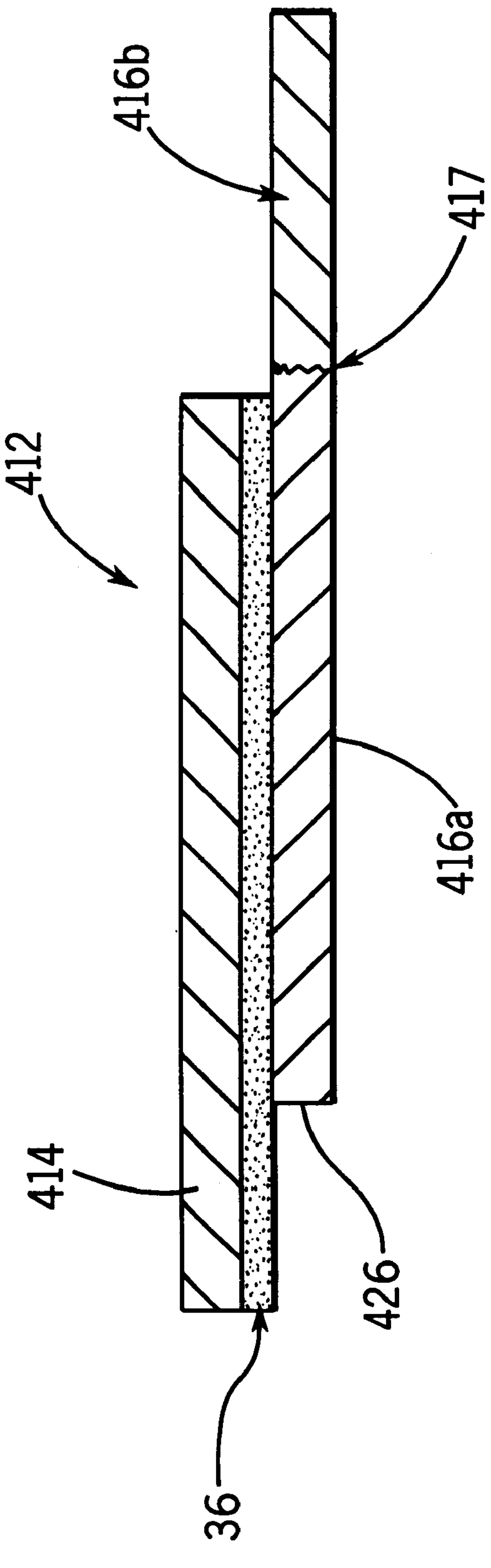
FIG. 9B is a cross-sectional view of another alternate embodiment of the present invention.

Referring now to FIGS. 9A–9B, additional embodiments of the present invention are illustrated. Strip 312 includes a series of notes 314 releasably adhered to 316 by adhesive 36. In this embodiment, the release sheet 316 does not have any transverse score lines, such that release sheet 316*a* extends the length of the strip 312 which may be removed with note 314 by tearing along edge 317, which may be a line of weakness along the release sheet 316.

Strip 412 similarly has each note 414 removably adhered to release sheet web 426, which is divided into individual release sheets 416*a* and 416*b* by a perforation for 417 such that release sheet 416*a* may be removed with note 414, thereby leaving release sheet 416*b* to be removed with the next consecutive note to be removed. Although only a single note and release sheet combination is shown, it is understood that such combination is part of a longer strip containing at least three of such pairs of notes and release sheets.

A method of making a strip for dispensing adhesive notes is also contemplated by the present invention. The method includes adhering a continuous note sheet row having a pressure sensitive adhesive to a continuous release sheet row, sectioning the continuous note sheet row into a plurality of notes, and sectioning the continuous release sheet row into a plurality of release sheets laterally offset from the notes. The sectioning step may include cutting. scoring, or creating lines of weakness on the continuous note sheet row and the continuous release sheet row. The sectioning of the continuous note sheet row and the continuous release sheet row may occur simultaneously.

Adhesives that may be used as the adhesive sheet adhesive in the present invention are illustrated by the examples which follow. These examples are not to be construed as limiting the scope of the invention, which is defined by the appended claims.

TEST METHODS

Test for Conformability

A sample of the rectangular adhesive sheet measuring 0.5 inch by 1.5 inch (1.3 cm by 3.8 cm) is applied to a clean, polished half-inch diameter stainless steel cylinder such that the short side is oriented along the axis of the cylinder and the long side is oriented along the circumference of the cylinder, known as "flagging". The cylinder is then exposed to a temperature of 77°±5° F. (25°±3° C.) and a relative humidity not greater than 80% for a period of 10 hours.

Conformability failure is indicated by opening up of the flags, i.e., visible edge separation, at the conclusion of the 10 hour test. It is a pass/fail test.

Test for Cohesive Strength

Cohesive strength may be determined indirectly by measuring the shear strength of the adhesive according to ASTM D3654-88, also known as PSTC-7, and recording whether adhesive is left on both the adhesive sheet and the panel to which it was adhered after failure. In this case, PSTC-7 has been modified to use 1×0.5 inch (2.5 by 1.3 cm) samples. A sample of the rectangular adhesive sheet measuring 1×0.5 inch (2.5 by 1.3 cm) is applied to a vertical stainless steel panel with a 0.5 inch (1.3 cm) overlap joint. A mass of 1000 g is suspended from the sample and the time until failure is measured in an environment having a temperature of 73° F. (23° C.) and a relative humidity of 50 percent. A determination is then made whether adhesive is left on both the tape and the panel by visual inspection. If there is, the test shows cohesive failure.

If there is no adhesive left on the panel, the test indicates adhesive failure to the panel, i.e., the cohesive strength is greater than the shear strength of the bond to the panel, and the adhesive passes the test for cohesive strength.

If there is some or no adhesive left on the adhesive sheet and it has been transferred to the panel, the test does not provide information about the cohesive strength of the adhesive, but rather shows failure of the adhesive to form a sufficient adhesive bond to the backing material of the adhesive sheet. This indicates the need for either another adhesive, another backing material, or the need to pre-treat the surface of the backing material to be coated with adhesive such that it forms a stronger bond with the adhesive, such as with a sizing agent.

EXAMPLES

The following are examples of formulations of adhesives which are useful for making the adhesive sheet assemblies according to the present invention. These formulations may be coated or transferred onto any of the films, sheets or cloths described above as useful for making the adhesive sheets.

TABLE I

| COMPOSITION OF FORMULATIONS A, B AND C IN WEIGHT-PERCENT | | | |
|---|---|---|---|
| INGREDIENT | A | B | C |
| Heveacrumb ™ SMR-5LX Lamco[1] | 3.86 | — | 10.18 |
| Synpol ™ Type 1011A[2] | 11.58 | 17.02 | — |
| Vistanex MM-L-80[3] | — | — | 2.60 |
| Foral ™ 105[4] | 18.52 | 15.32 | — |
| Piccolyte S-115[5] | — | — | 14.73 |
| Herolyn D[6] | — | — | 3.12 |
| Indopol H-100[7] | — | — | 3.12 |
| Santovar ™ A[8] | 0.15 | 0.09 | — |
| Agarite ™ Resin D[9] | 0.08 | 0.09 | — |
| Wingstay ™ L Powder[10] | — | — | 0.14 |
| ASARCO ™ ZO-77T[11] | 7.72 | 8.51 | 0.64 |
| Methyl Zimate[12] | 0.62 | 0.68 | 0.50 |
| Sulfads ™ Powder[13] | 0.04 | 0.04 | — |
| Tween ™ 20[14] | — | — | 0.12 |
| K-1717B[15] | — | — | 1.22 |
| Solvent | balance | balance | balance |

[1]Natural rubber elastomer available from Herron & Meyer
[2]Styrene butadiene copolymer elastomer available from American Synpol Corp.
[3]Polyisobutylene elastomer available from Exxon Chemical
[4]Rosin ester tackifier available from Hercules, Inc.
[5]Polyterpener resin tackifier available from Hercules, Inc.
[6]Hydrogenated methyl ester of rosin tackifier available from Hercules, Inc.
[7]Polybutene tackifier available from Amoco Chemical Corp.
[8]2,5-di-tert-amylhydroquinone antioxidant available from Flexsys America L.P.
[9]Antioxidant available from R.T. Vanderbilt Co.
[10]Antioxidant available from Goodyear Tire & Rubber Co.
[11]Zinc oxide curing agent available from Jenson-Souders Assocs., Inc.
[12]Zinc dimethyldithiocarbamate accelerator available from R.T. Vanderbilt Co.
[13]Dipentamethylene thiuram hexasulfide accelerator available from R.T. Vanderbilt Co.
[14]Polysorbate 20 surfactant available from ICI Specialties Mfg.
[15]Polyketone resin plasticizer available from Lawter Chemical, Inc.

Formulation D

An acrylic-based adhesive formulation D is prepared by combining 99.72 wt % Duro-Tak™ 80-1047 (an acrylic resin available from National Starch and Chemical Co.) with 0.17 wt % Uformite-27-803 (a melamine resin curing agent available from Reichhold Chemical Coating Div.) in an appropriate solvent (balance).

Formulation E

Another acrylic-based adhesive formulation is prepared by diluting Aroset™ 1044-Z-40 (an acrylic resin adhesive available from Ashland Chemical, Inc.) with an appropriate solvent so that the resin comprises 39–41 wt % of the formulation.

Formulation F

Yet another acrylic-based adhesive formulation F is prepared by diluting Aroset™ 1085-Z-38 (an acrylic resin adhesive also available from Ashland Chemical) with an appropriate solvent so that the resin comprises 36.5–38.5 wt % of the formulation.

Although the invention has been described in considerable detail through the preceding specific embodiments, it is to be understood that these embodiments are for purpose of illustration only. Many variations and modifications can be made by one skilled in the art without departing from the spirit and scope of the invention.

We claim:

1. A strip for dispensing adhesive notes, said strip comprising:

(a) a row of at least a first, second and third release sheet disposed consecutively relative to each other in lateral alignment; and (b) a row of at least a first, second and third note disposed consecutively relative to each other in lateral alignment, said row of notes facing said row of release sheets and laterally offset relative to said row of release sheets such that each note and each release sheet is disposed in alternate staggered relationship relative to each other, each note defining a first and a second face, said first face being printable thereon and said second face having an adhesive applied thereon such that said layer of adhesive releasably adheres to adjacent sheets of said row of release sheets so that at least one note may be peeled from the strip together with a corresponding number of adjacent release sheets.

2. The strip of claim 1, wherein each of said release sheets defines a border adjacent to a juncture between adjacent notes so that by lifting along said border, an individual note combined with a portion of said release sheet may be removed from the strip at the border.

3. The strip of claim 2, wherein each border is laterally offset from the juncture between adjacent notes so that by lifting along said border, a portion of the release sheet remaining adhered to the strip protrudes beyond the note to which that release sheet is adhered.

4. The strip of claim 1, wherein said notes and said release sheets have substantially the same shape and dimensions.

5. The strip of claim 1 wherein a substantial portion of the adhesive in the strip is unexposed prior to removal from the release sheet.

6. A strip for dispensing adhesive notes, said strip comprising:

(a) a plurality of release sheets including at least a first, second and third release sheet, each sheet having a first and second side and a first and a second portion on the first side; and (b) a plurality of notes including at least a first, second and third note, each note defining a printable first face and an adhesive second face, each note having a first and a second part, said first portion of said first release sheet being releasably adhered to said second part of said first note, said second portion of said first release sheet being releasably adhered to said first part of said second note, said second part of said second note being releasably adhered to said first portion of said second release sheet.

7. The strip of claim 6 wherein the notes are laterally offset from the release sheets such that each note and each release sheet is disposed in alternate staggered relationship relative to each other.

8. A strip for dispensing adhesive notes comprising:

(a) a first web having one surface coated with an adhesive;

(b) a second web having at least one release surface facing and releasably engaged with the adhesive surface of the first web, the first web defining a series of transverse score lines or lines of weakness and the second web also defining one of a series of transverse score lines and lines of weakness, wherein the transverse score lines or lines of weakness of the second web are in staggered relationship to the transverse score lines or lines of weakness of the first web; and wherein the first web is made up of a plurality of consecutively disposed note sheets and the second web is made up of a plurality of consecutively disposed release sheets.

9. An adhesive note dispensing kit comprising:

a strip for dispensing adhesive notes in a roll form;

a dispenser adapted for holding the strip such that the strip rotates about a roll form axis to present, for removal by pulling, an adhesive note together with at least one release sheet; and wherein the strip for dispensing adhesive notes comprises:

(a) a row of at least a first, second and third release sheet disposed consecutively relative to each other in lateral alignment; and (b) a row of at least a first, second and third note disposed consecutively relative to each other in lateral alignment, said row of notes facing said row of release sheets and laterally offset relative to said row of release sheets such that each note and each release sheet is disposed in alternate staggered relationship relative to each other, each note defining a first and a second face, said first face being printable thereon and said second face having an adhesive applied thereon such that said layer of adhesive releasably adheres to adjacent sheets of said row of release sheets so that at least one note may be peeled from the strip together with a corresponding number of adjacent release sheets.

10. The kit of claim 9 wherein the dispenser is a container adapted for substantially enclosing the roll form of the strip, the dispenser having an opening to permit removal of the strip from the dispenser through the opening.

11. The kit of claim 9 wherein each adhesive note on the strip includes an identifying indicia printed thereon.

12. An adhesive note dispensing kit comprising:

a strip for dispensing adhesive notes in a roll form;

a dispenser adapted for holding the strip such that the strip rotates about a roll form axis to present, for removal by pulling, an adhesive note together with at least one release sheet; and wherein the strip for dispensing adhesive notes comprises:

(a) a plurality of release sheets including at least a first, second and third release sheet, each sheet having a first and second side and a first and a second portion on the first side; and (b) a plurality of notes including at least a first, second and third note, each note defining a printable first face and an adhesive second face, each note having a first and a second part, said first portion of said first release sheet being releasably adhered to said second part of said first note, said second portion of said first release sheet being releasably adhered to said first part of said second note, said second part of said second note being releasably adhered to said first portion of said second release sheet.

* * * * *